March 29, 1938.  F. M. FLETCHER  2,112,457
COLOR KEY INDICATOR
Filed May 22, 1936
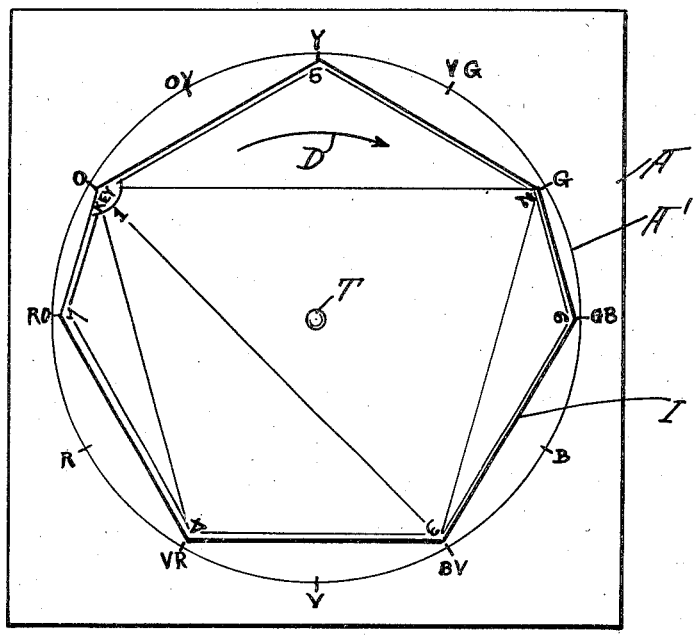
Fig. 1.
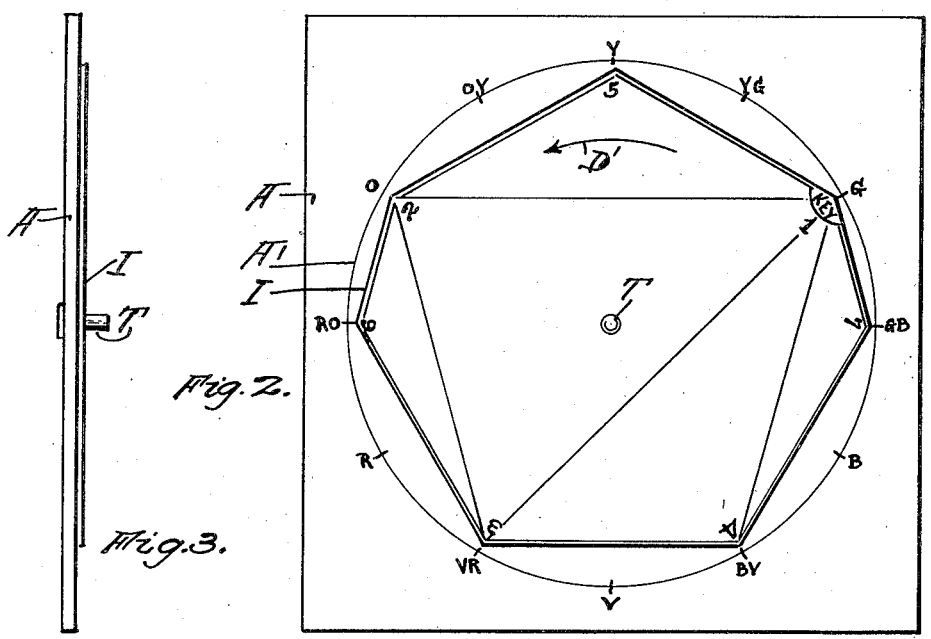
Fig. 2.
Fig. 3.
Inventor,
F. M. Fletcher;
By
F. E. Maynard
atty.

Patented Mar. 29, 1938

2,112,457

UNITED STATES PATENT OFFICE 2,112,457

COLOR KEY INDICATOR

Frank Morley Fletcher, Los Angeles, Calif.

Application May 22, 1936, Serial No. 81,210

5 Claims. (Cl. 88—14)

This invention is an instrument to be used by artists and others planning color schemes in various arts.

An object is to provide a simple, practical and low cost indicating device whereby to readily and efficiently select a group of colors which will harmoniously combine with a given key color, and an object is to provide a scale of color of large range of color keys and a selecting indicator cooperative therewith whereby to show at a glance a large group of colors harmonizing with each of the key colors.

The invention consists of certain advancements in this class of devices as set forth in the ensuing disclosure and having, with the above, additional objects and advantages hereinafter developed, and whose construction, combination and details of means, and the manner of operation will be made manifest in the description of the annexed illustrative form; it being understood that modifications, variations and adaptations may be resorted to within the concept of the invention as it is more directly claimed hereinafter.

Figure 1 is a plan or face view of the color indicating instrument, in group showing position as to the key color orange in the scale. Figure 2 is a plan of the reverse face of the movable, selecting member of the device adjusted to the key color green. Figure 3 is an edge view of the structural elements of the indicator.

The instrument consists of a basal element A, such as a stiff, plane card having a trunnion T on which is mounted a rotary indicator member I for color group selection and which is reversible face for face to increase functional capacity.

On the face of the base card A there is a series of symbols spaced in equal arcs of a circle about the trunnion T, and may or may not have an associated scale circle A'. The symbols are the initial letters of the colors or the combinations of colors forming the keys in the color scale and are not to be considered relative, in spacing, to the spectrum.

The color order as here shown, to the right, in the circle is Y (yellow), YG (yellow green), G (green), GB (green blue), B (blue), BV (blue violet), V (violet), VR (violet red), R (red), RO (red orange), O (orange), and OY (orange yellow).

The indicator member I consists of a plane, heptagonal card having a form corresponding to the angular disposition of a series of color numbers 5, 2, 6, 3, 4, 7, and 1, and which are arranged in a circle concentric with and in proximity to the circle of color symbols, above given. It will be noticed that the numbers are not regularly progressive in order and are peculiarly intermixed and are not evenly spaced, though they are spaced in such angular relation as to be, as a group, registerable with a group of color symbols which harmonize with respect to each key color severally selected. That is, the numbered angles of the heptagonal card are spaced angularly so as to be registered at one time with a like number of the scale symbols.

To obtain the greatest variety of colors between any three, main color symbols, at points of unequal arc intervals in the scale, a triangle, or color triad, is made by a chordal line from the "key" number 1 to the number 2 on the rotary card I and subtends an arc of four intervals on the color circle or scale, Fig. 1, and a chordal line subtends indicator numbers 2 and 3, at three intervals apart, and a long chord subtends indicator numbers 1 and 3, at five intervals. This gives a large variety of intervals in the color scale without including opposite color symbols, and provides two points in harmonious contrast, all available at each key color selection on the scale.

A fourth point 4, of the selecting card I, is connected by a chordal line to the index point 1 and an additional, three interval arc is brought into selecting range. A further range is made, still avoiding clash of opposites, by a chord from index 1 to index 5, embracing two color intervals.

Thus, selection of the harmonious colors as to any one of the scale symbols in the range may be readily facilitated in making up a color combination. Further addition to the range is made by a line from index 2 to index 6, or from 1 to 7, without incurring opposite clash of colors. This seven pointed index card has characteristics possessed by no other form that can be made by seven points in a series or circle of twelve equal intervals of color symbols. Each of its points is in harmonious contrast with two nearly opposite points, excepting one pair which is in direct opposition, that is 6 and 7. The heptagonal card I is symmetrical only with respect to the diameter through the index point 5 and the center of the circle.

By revolving the index card I on its center the color grouping numbers will touch a different series of seven color symbols of the scale at each selective movement to any desired key color, a majority having a harmonious color relation.

It follows from the order of the successive steps in the construction of the 4—3—5 color interval triangle or color triad that there is only one other figure that could serve in precisely the same way. This would be the same figure reversed, each step being taken in the counter-clockwise direction, Fig. 2, in contrast to the clockwise rotation of the card I, Fig. 1; it being understood that the order and arrangement of the group index numbers are identical on the obverse face, Fig. 1, and the reverse face, Fig. 2, of the card I, the only difference being in the directional arrows D—D' on the respective faces of the card which indicate the order of the numbers rather than the direction of rotation of the card, since this may obviously be revolved in either direction, with either face upward. By reversing the card face for face its grouping index numbers set off twelve new groups of colors as to the color scale; that is different from the groups set off when the obverse face, Fig. 1, is upward.

This great range of possible harmonious color grouping as to the scale colors will be obvious to all students of color combination.

What is claimed is:

1. A device for selecting a group of colors which will harmonize with a given key color, comprising, in combination, a base member bearing a circular scale of color symbols equally spaced in the circle in substantially the following order;

Y—YG—G—GB—B—BV—V—VR—R—RO—O—OY, reading clockwise, and a relatively rotatable, heptagonal, color group selector card within the circular scale and pivoted on said base member concentrically of the circle; said card inscribing a facial triangular figure of unequal sides with the apex of its longest sides being marked as the "key" for selective registration with any one of the symbols, and the apices of the card being so angularly spaced that when the card is positioned with its "key" apex adjacent any symbol on the scale the other apices are adjacent symbols representing colors harmonizing with the color represented by the color symbol at which the "key" mark is set.

2. A color group selector as set forth in claim 1, and in which the "key" apex is provided with base numeral "1" and the other apices of the card are provided with numbers each differing in magnitude from the base number in accordance with the degree of disharmony between the color indicated by the corresponding apex and the "key" color.

3. A color group selector comprising, in combination, the elements as set forth in claim 1, and in which the card is reversible face for face on the base member, and the reverse face having a corresponding triangle in a directly reversed relation as to the triangle on the obverse face.

4. A color group selector comprising, in combination, the elements as set forth in claim 1, and in which five sides of the rotary card are each of the length of a chord connecting color symbols of two successive intervals of the circle scale, and two of the sides are of the length of a chord connecting symbols of one interval of the circle scale and are at diametrically opposite sides of the said card; the longest side of the inscribed triangle having a length equal to the chord of five of the circular scale intervals, the next longer having a length of four of the scale intervals, and the point of intersection of said sides constituting the said "key" point of the selector card and bearing mark "1", the opposite end of the second line being marked "2", and the opposite end of the longest side being marked "3".

5. A color group selector as set out in claim 1, and in which the heptagon has five equal sides and two shorter sides which latter are in nearly diametrically opposite relation on the heptagonal card and have a length equal to the chord of one interval of the circular scale, and the angles of the card, beginning at one end of one of the short sides, being marked in the following order "1", "5", "2", "6", "3", "4", and "7".

FRANK MORLEY FLETCHER.